United States Patent [19]

Kawakami et al.

[11] Patent Number: 4,462,336

[45] Date of Patent: Jul. 31, 1984

[54] FARROWING PEN FOR DOMESTIC ANIMALS

[75] Inventors: Ryusi Kawakami; Tadahiro Masumura, both of Tochigi, Japan

[73] Assignee: C. Itoh Feed Mills Co., Ltd., Tokyo, Japan

[21] Appl. No.: 390,112

[22] Filed: Jun. 18, 1982

[30] Foreign Application Priority Data

Jun. 25, 1981 [JP] Japan ................................ 56/97476

[51] Int. Cl.³ .............................................. A01K 1/02
[52] U.S. Cl. ......................................... 119/20; 119/28
[58] Field of Search .............................. 119/20, 16, 28

[56] References Cited

U.S. PATENT DOCUMENTS 1,737,211  11/1929  Barker ..................................... 119/16
3,042,000  7/1962   McMurray et al. .................... 119/20
3,084,668  4/1963   McMurray et al. .................... 119/20
3,181,503  5/1965   Tripp ..................................... 119/20
4,252,082  2/1981   Herring ................................. 119/20
4,348,986  9/1982   Marrs .................................... 119/20

Primary Examiner—Hugh R. Chamblee
Attorney, Agent, or Firm—Burgess, Ryan & Wayne

[57] ABSTRACT

A farrowing pen having a central mother pen and newborn pens provided on each side of the mother pen, the floor height of the mother pen is higher than those of the newborn pens, and the width of the mother pen is the minimum required to allow a mother animal to lie down or slightly larger than that. This arrangement protects baby animals against crushing by their mother and enables them to have an equal opportunity of taking the mother's milk.

2 Claims, 2 Drawing Figures

FARROWING PEN FOR DOMESTIC ANIMALS

This invention relates to a fenced pen for the delivery and nursing of domestic animals such as swine.

BACKGROUND OF THE INVENTION

There is known a farrowing pen for swine which comprises a sow's pen and a pair of newborn pens provided both sides of the sow's pen. All the known pens have an equal floor height, or the newborn pens have a higher floor level than the sow's pen since they generally have a heat insulation mat placed on the floor. Each newborn pen is divided from the sow's pen by a side fence usually comprising a pair of vertically spaced apart horizontal bars. The distance between the side fences, or in other words, the width of the sow's pen has been sufficiently large to permit a sow to stand up or lie down easily.

In such a farrowing pen, when a sow lies down, a piglet was sometimes pressed to death under its mother, or when the sow would stand up, she sometimes kicked or trod on a piglet with her hind leg, and caused it to die. The death of piglets from the pressure of their mother has long been a serious problem. More complete separation of the newborn pens from the sow's pen, provision of heat insulation mats in the newborn pens, and other measures have, therefore, been taken to keep piglets away from their mother. Nevertheless, a large number of piglets are still crushed, and swine producers have difficulty in protecting piglets.

A sow lies down when suckling her piglets. She usually offers the upper row of nipples to her piglets first, and then, the lower row of the nipples. Accordingly, it is impossible for all the piglets to take the mother's milk at a time, resulting in a difference in the rate of their growth.

BRIEF SUMMARY OF THE INVENTION

The inventors have found that when a mother pen such as the sow's pen of a farrowing pen, has a smaller width and floor level which is higher than those of the newborn pens, the arrangement protects baby animals against crushing death by their mother and enables them to have an equal opportunity of taking the mother's milk.

BRIEF DESCRIPTION OF THE DRAWINGS

The invention will now be described in detail with reference to an embodiment thereof as shown in the drawings.

DETAILED DESCRIPTION OF THE INVENTION

Figure 1:
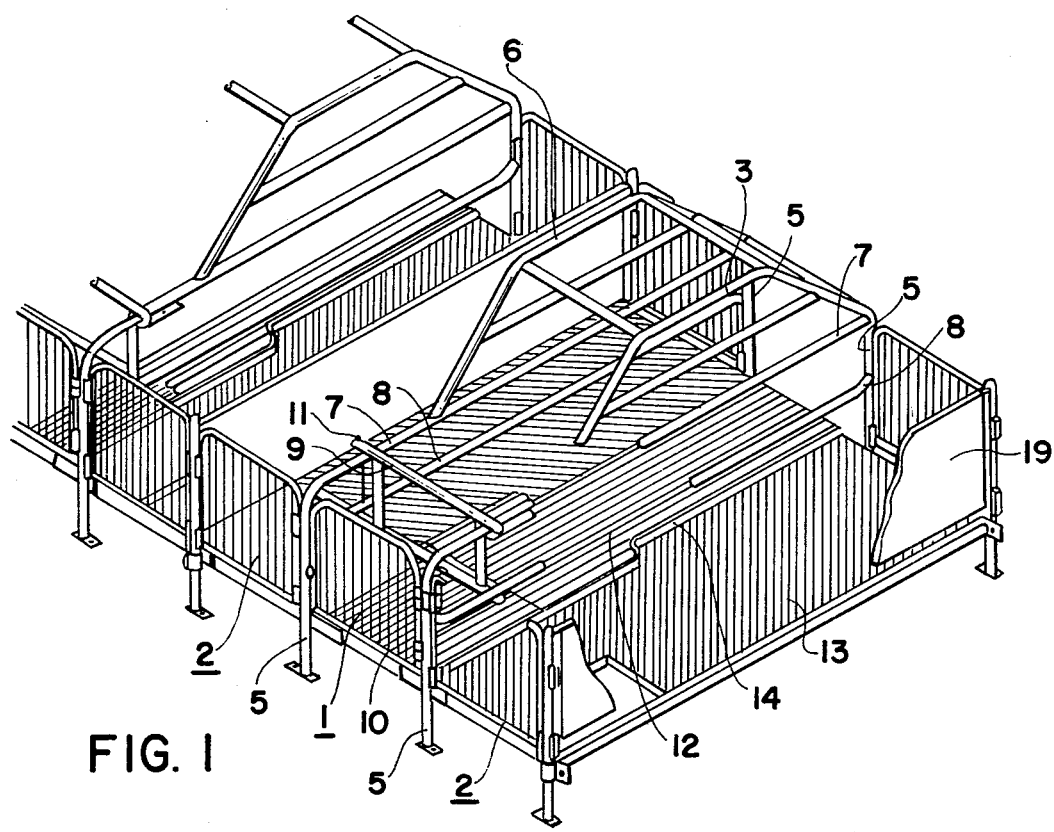
FIG. 1 is a perspective view of a farrowing pen for swine embodying this invention.
Figure 2:
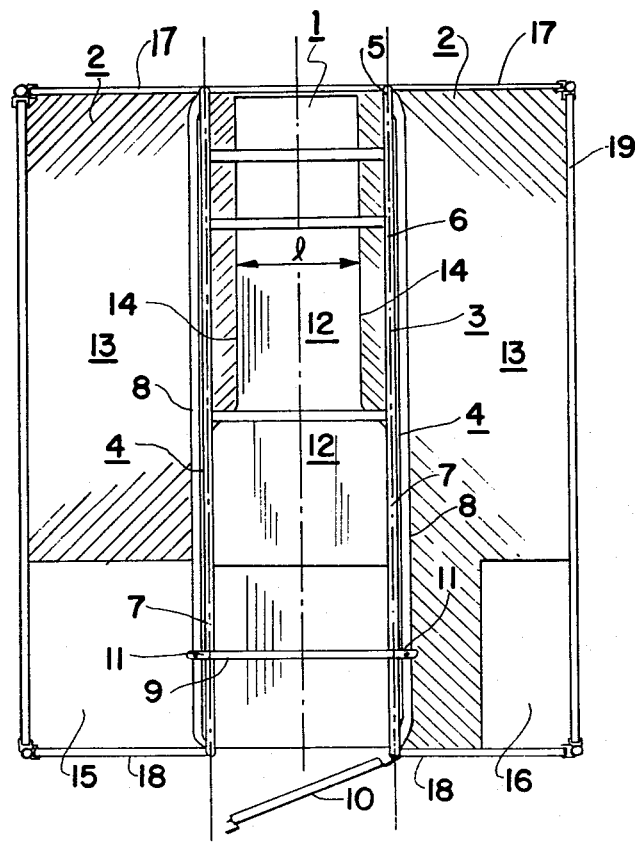
FIG. 2 is a top plan view thereof.

The farrowing pen comprises a central sow's pen 1, and newborns pens 2 located on each side of the sow's pen.

The sow's pen is defined by a partition fence 3 of the whole frame construction which comprises a pair of side fence portions 4 dividing the sow's pen from the newborn pens 2, four posts 5, and an upwardly projecting front frame portion 6. Each side fence portion 4 comprises two vertically spaced apart horizontal bars 7 and 8. The upper bar 7 has a level of height which generally corresponds to the center of the body of a sow in her standing position. The upper fence bars 7, 7 have a distance therebetween which is slightly greater than the width of the sow's body. The lower fence bars 8 have a level of height which generally corresponds to that of the center of the sow's body in her lying positon. The lower bars 8, 8 have a distance therebetween which is sufficiently large to provide a space in which the sow can lie. The distance between the lower bars 8, 8 generally is slightly greater than the distance between the upper bars 7, 7.

This spacing between the side fence portions 4, 4 which is the minimum required to enable a mother animal to stand up or lie down, or slightly greater, is one of the important features of this invention. This feature prevents any sudden movement of the mother animal that may cause crushing death of her babies and also enables the mother to lie in a fixed position in which her nipples are located adjacent to shoulders 14. There is no other limitation in particular to the side fence portions 4 if their spacing is as set forth above and if baby animals are free to move under the side fence portions 4. Accordingly, it is, for example, possible to employ more fence bars, or provide vertical bars by which the horizontal bars are connected to one another.

The upwardly projecting frame portion 6 is provided to prevent escape of the sow from the sow's pen. A transversely extending rump stop fence member 9 is provided adjacent to the rear ends of the side fence portions 4. The stop member 9 prevents the sow from having her rump strike against the gate 10, and also serves to narrow the area in which the sow can move, so that the piglets may be protected from crushing death by their mother. The stop member 9 also secures a passage which enables the piglets to move between the two newborn pens 2. The stop member 9 is positionally adjustable to suit the body length of the sow, and is fixed to the side fence portions 4 by pins 11.

Another important feature of the farrowing pen according to this invention resides in the floor of the sow's pen 1. The sow's pen has a floor 12 at a level which is higher than the level of the floors 13 of the newborn pens. The floor 12 of the sow's pen has a width l which is the minimum required to permit the mother animal to lie, or slightly greater. The width l may be in the range of 50 to 70 cm for a sow's pen for a swine of average size. This width limitation, and the limited distance between the side fence portions forces the mother animal to lie down slowly, so that the baby animals can escape, or be pushed aside, into the newborn pens 2 having a lower floor level, before their mother lies down, whereby the crushing death of the babies by the body of their mother is prevented. The shoulders 14 permit the babies to have access to the lower row of their mother's nipples, as well as the upper row so that all the piglets can take milk at a time.

According to the embodiment shown in the drawings, the floor of the sow's pen has a somewhat narrower width in its front portion than in its rear portion, since the distance between the hind legs of the sow is greater than that between her forelegs.

The shoulder 14 may have a height of 1 to 15 cm, and suitably 2 to 5 cm, if the farrowing pen is, for example, intended for swine. The shoulders 14 do not necessarily need to define a right angle, but if the slope of the shoulders 14 is too gentle, the object of this invention cannot be attained. A suitable angle of the shoulders 14 toward the horizontal is greater than 30° and preferably, greater than 60°. It is preferable for each shoulder 14 to have a rounded corner so as not injure the animals.

The floors may be made of any material employed in the known farrowing pens, as, for example, wood, concrete, steel plate, plastic-coated metal wire netting, plastic flooring materials, or elastic flooring materials. The floors of the farrowing pen shown in the drawings are slatted floors formed by a multiplicity of steel strips having a width of 30 mm, and laid close to one another at intervals of 8 mm. The slats forming the floor of the sow's pen 1 extend longitudinally thereof, while the slats forming the floor of each newborn pen 2 lie at an angle to the sow's pen. The inclination of the slats in the floors of the newborn pens prevents mother animal from engaging her toenails with the slats in the floor of either newborn pen when she stands up, so that she may not kick her babies. In this connection, suitable angles of the inclined slats are in the range of 20° to 60° toward the longitudinal direction of the mother pen.

In the embodiment shown in the drawings, the floor of each newborn pen 2 is provided at its rear end with a rectangular recess 15 or 16 in which a heat insulation mat may be placed.

The front and rear ends of the farrowing pen do not have any novel features. In the embodiment shown, each newborn pen 2 is provided with a front fence 17 and a rear fence 18 which are removable. A gate 10 is provided at the rear end of the mother pen 1, while a feeder and a waterer (not shown in the figures) may be provided at the front end thereof.

A plurality of farrowing pens according to this invention may be joined to one another. FIG. 1, by way of example, shows another unit joined to the left-hand side of the farrowing pen hereinabove described. 19 is a solid plate.

In the conventional farrowing pen, the rate of death of piglets by crushing death has shown a sharp increase with an increase in the number of newborns, particularly when eight or more piglets are born. The farrowing pen of this invention markedly reduces the rate of death by crushing. The farrowing pen of this invention also reduces the difference in the weight of weanling piglets. The difference in weight has been great among piglets grown in conventional farrowing pens.

I claim:

1. In a farrowing pen for a swine comprising a mother pen having a front portion to accommodate the head and shoulder portion of the swine and a rear portion to accommodate the rump portion of the swine and newborn pens provided at both sides of the mother pen, separated by fences and the floor of the mother pen which is at a level above the level of the floor of the newborn pens and which is separated by a shoulder from the floor of each newborn pen, the improvement which comprises: the width of the floor of the mother pen being about the minimum width to allow the mother swine to lie thereon, the width of the front portion of the floor of the mother pen being narrower than the width of the rear portion of the floor in accordance with the distance between forelegs being smaller than the distance between the hind legs and the distance between the fences being just large enough to allow the mother swine to stand up and lie down, and said floor of the newborn pens is a slatted floor wherein the slats lie at an angle to the mother pen.

2. The farrowing pen of claim 1, wherein said angle is in the range of 20° to 60° toward the longitudinal direction of the mother pen.

* * * * *